Sept. 4, 1956     F. D. DOLAN     2,761,474
ADJUSTABLE SUPPORT FOR PORTABLE POWER SAWS
Filed May 17, 1955     3 Sheets-Sheet 1
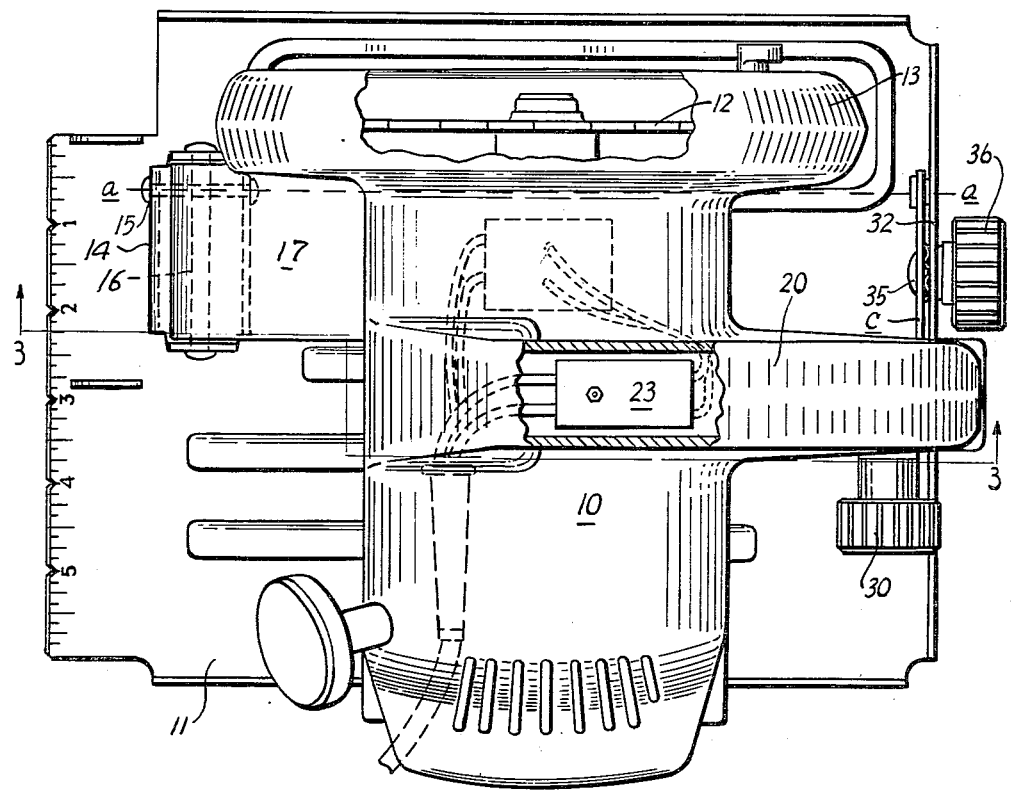
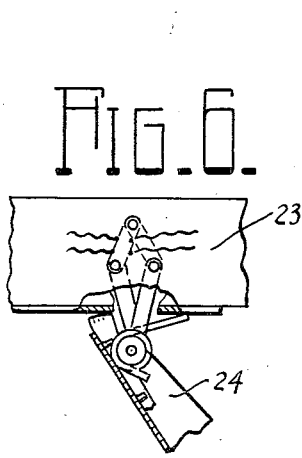
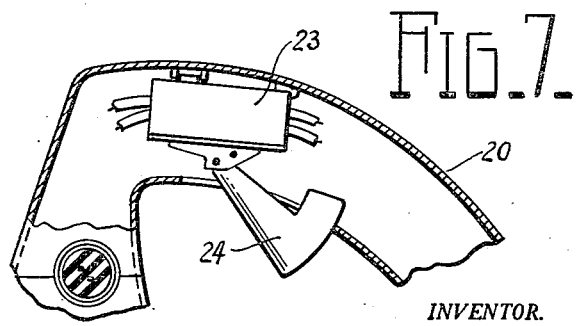
INVENTOR.
FRANCIS D. DOLAN
BY Owen & Owen
ATTORNEYS.

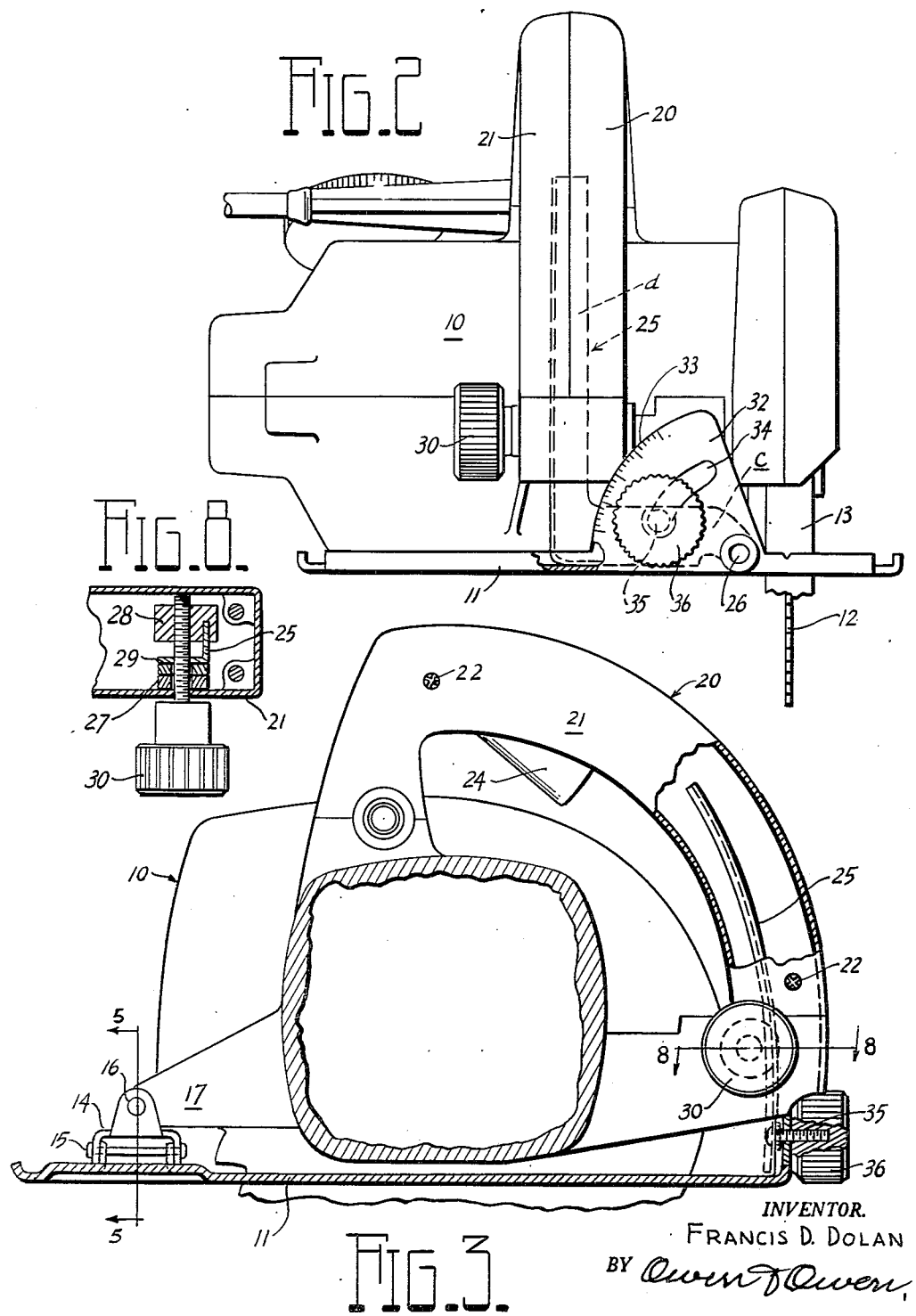

Sept. 4, 1956　　　　　　　F. D. DOLAN　　　　　　2,761,474
ADJUSTABLE SUPPORT FOR PORTABLE POWER SAWS
Filed May 17, 1955　　　　　　　　　　　　　3 Sheets-Sheet 3
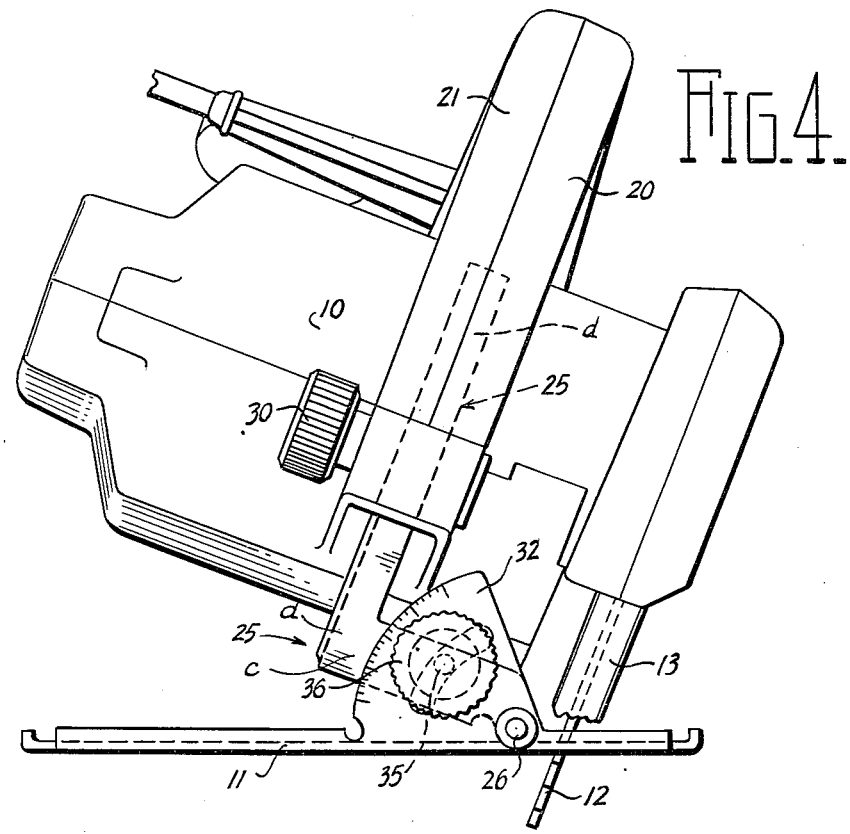
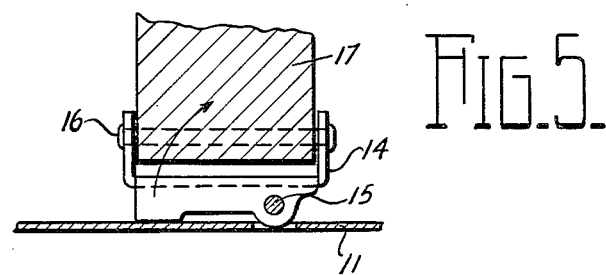
INVENTOR.
FRANCIS D. DOLAN
BY Owen & Owen
ATTORNEYS

United States Patent Office 2,761,474
Patented Sept. 4, 1956

2,761,474

ADJUSTABLE SUPPORT FOR PORTABLE POWER SAWS

Francis D. Dolan, Toledo, Ohio, assignor to The American Floor Surfacing Machine Company, Toledo, Ohio, a corporation of Ohio Application May 17, 1955, Serial No. 508,867

8 Claims. (Cl. 143—43)

This invention relates to portable power saws, and particularly to adjustable saw cutting depth and lateral tilting means therefor.

An object of the invention is the provision in a saw of this character, of novel adjustable means for the saw elevating and tilting parts, which means is easily and quickly operable to effect a tilting of the saw disk and body to any desired angle relative to the plane of operation of the saw base plate, to vary the depth of cut of the saw and to firmly support the elevated and/or tilted parts in adjusted positions.

Another object of the invention is the provision of an elevating and tilt adjusting means for saws of this character, which means has a guide part projecting within the hollow of the saw control handle lengthwise thereof and which, when adjusted, cooperates with the handle and with the base plate to firmly support the saw body and to resist lateral tilting of the saw upon application of a downward pressure to the handle during sawing operations, an objection incident, so far as I am aware, to the adjustable saws of the present type heretofore used.

Further objects and advantages of the invention will be apparent from the following detailed description, and from the accompanying drawings illustrating one embodiment thereof, and in which—

Fig. 1 is a plan view of a portable power saw embodying the invention, with parts broken away;

Fig. 2 is a rear end view thereof;

Fig. 3 is a vertical section on the line 3—3 in Fig. 1, with parts broken away and removed;

Fig. 4 is a view similar to Fig. 2, with the saw carrying body elevated relative to the base plate to reduce the cutting depth and with the saw and body tilted relative to the base plate to obtain a bevel cut;

Fig. 5 is an enlarged sectional detail taken on the line 5—5 in Fig. 3;

Figs. 6 and 7 (sheet 1) are sectional details of the control switch and its mounting, and Fig. 8 (sheet 2) is a section on the line 8—8 in Fig. 3, with parts in full.

Referring to the drawings, 10 designates the body of a portable power saw embodying the invention and 11 the customary base plate on which the body is mounted for pivotal raising and lowering movements to vary the depth of cut of the saw and also for lateral tilting movements to incline the saw axis for bevel cutting.

The body 10 contains an electric motor the shaft of which has driving connection with the saw 12, as well understood in the art. The pivoted saw guard commonly used is designated 13. The body is hinged at its forward end to the base plate for compound vertical and lateral tilting movements, as shown in Figs. 1, 3 and 5, and as is common in the art. This hinge connection comprises, in the present instance, an inverted U-shaped cradle 14 pivoted at 15 between two lugs on the base plate for transverse tilting of the body to obtain a bevel cut, and also pivoted at 16 to a body part 17 to permit raising and lowering forward and rearward tilting movements of the body relative to the base plate to vary the depth of cut. The transverse tilting pivot 15 is adjacent to the plane of the saw, as shown in Fig. 1, its axial line being indicated by the line a—a in said figure. The rear pivotal support for the saw body has its axis aligned with that of the pivot 15 and will be later described.

The body 10 is provided at the rear thereof and substantially centrally of its ends with a hallow arcuate handle 20 which extends rearwardly and downwardly from the top of the body and has its lower end open and terminated adjacent to and above the rear edge portion of the base plate 11, as shown in Figs. 1, 2 and 3. The handle 20 is provided at one side with a removable side plate 21, held to the handle by screws 22, and when removed permits access to the interior of the handle where the control switch 23 for the motor is located. This switch, in the present instance, is of the toggle link type and has its trigger finger 24 projecting through a slot in the handle in convenient position to be operated by the first finger of a hand grasping the handle, as well understood in the art.

The support for the body 10 by which it is held in adjusted raised and transverse tilting positions, and in which the present invention primarily resides, comprises an L-shaped support member 25 the lower or short arm c of which is disposed crosswise of the base plate 11 with its outer end extending to the right of the handle and pivoted at 26 to the base plate in coaxial relation to front pivot 15, as indicated by the line a—a in Fig. 1. The long upright arm d of the support 25 registers with and extends upwardly into the hollow of the handle 20 through its open lower end, and is curved to substantially conform to the arc of the handle. The support 25 is preferably flanged at least at one edge to give it rigidity and is edgewise engaged between clamping pieces 27 and 28 located within the handle 20 and controlled by a screw 29 having a control knob 30 at the outer side of the handle. This screw projects freely through the handle side and clamping piece 27 and threads into the piece 28, as shown in Fig. 8, whereby a turning of the screw in one direction will draw the clamping pieces together against the support 25. The unflanged edge of the support arm d is received by a slot in the piece 28, thus retaining the clamp in engagement with the support arm and preventing turning of the piece 28 relative thereto.

Rising from the rear edge of the base plate 11 close to the short arm c of the support 25 is a sector plate 32 having a curved edge concentric to the pivot 26 and intersected by the arm c. This edge is provided with degree graduations 33 with which a part of the arm may register. This plate 32 has a slot 34 concentric to its pivot axis and through which a screw stud 35 projects from the support arm c. A knurled nut 36 is threaded on this stud and when tightened clamps the arm to the plate to hold the support in adjusted lateral tilted position.

In use it is apparent that the body 10 with its saw may be tilted forward relative to the base plate 11 about the axis of the pivot 16 to obtain the desired depth of cut, the clamp 28 being loosened and tightened for the purpose by a turning of the knob 30. Also, that a lateral tilting adjustment of the body and saw may be obtained at any time by loosening the nut 36 and laterally tilting the body 10 and support 28 until the support arm c registers with the proper scale mark on the sector plate 32 to place the saw at the proper angle to obtain the bevel cut desired. This having been accomplished, the nut 36 is tightened to maintain the adjustment.

An important feature of the present adjustable support over those heretofore used in connection with portable hand operated power saws, at least so far as I am aware, is that the body engaging part of the support is substantially aligned with the longitudinal center of the handle so that any downward pressure on the handle during operation is distributed directly to the base plate in line with the handle, especially when the support arm c is level with the base plate. With devices of this character, where the adjustable forward tilting support is offset laterally from the handle, downward pressure on the handle during operation tends to laterally tilt the entire device relative to the work, thereby causing a binding of the saw and an imperfect cut.

I wish it understood that my invention is not limited to any specific construction, arrangement or form of the parts, as it is capable of numerous modifications and changes without departing from the spirit of the claims.

I claim:

1. In a portable power saw having a base plate and a saw carrying body mounted thereon for forward tilting movements about a forwardly positioned pivot to vary the depth of cut, the improvement which comprises an upwardly and forwardly extending handle on the rear end of the body having a longitudinally extending opening therein, a support arm extending upward from the base plate into the handle opening through the lower rear end portion of said handle for longitudinal movements therein, and means for fixedly connecting the handle and support arm to hold the body in adjusted relation to the base plate.

2. In a portable power saw having a base plate and a saw carrying body mounted thereon for forward tilting movements about a forwardly positioned pivot to vary the depth of saw cut, the improvement which comprises the provision of a hollow handle on the rear end of the body extending upward and forward relative to the base plate, a support arm mounted on the base plate and extending upward therefrom into said handle through the lower end thereof whereby the body and handle may be raised and lowered relative to the support arm, and means within the handle and operable from without the handle for holding the handle and support arm in adjusted relation, any downward thrust on the handle being distributed in line therewith to the base plate.

3. In a portable power saw having a base plate and a saw carrying body mounted thereon for forward tilting movements about a forwardly positioned axis to vary the permissible depth of saw cut, said body having on its rear portion an upwardly and forwardly extending hollow handle, the improvement which comprises a support arm rising from said base plate lengthwise of and within said handle for relative movement, lengthwise thereof and in substantially transverse centered relation thereto, and means carried by the handle for releasably connecting the handle and support arm to hold them in predetermined adjusted relation.

4. In a portable power saw having a base plate, a saw carrying body mounted at its forward side on the base plate for both forward and lateral tilting movements thereon to vary both the depth of saw cut and its bevel, and an upwardly and forwardly extending hollow handle on the body, the improvement which comprises an L-shaped support with its lateral arm pivoted at its free end to the base plate in coaxial relation to the lateral tilting axis of the pivot and with its upright arm within and in substantial register with said handle lengthwise thereof, means for holding the support in adjusted lateral tilted relation to the base plate, and means cooperating with the upright of the support and with the handle for holding the body in adjusted forwardly tilted relation to the base plate.

5. In a portable power saw having a base plate, a saw carrying body mounted on the base plate, the mounting between the plate and body comprising a double pivotal connection to permit both forward and lateral tilting of the body on the base plate whereby adjustment of both the depth of saw cut and its bevel may be obtained, said mounting connection being located forward of the body and at the saw carrying side thereof, the improvement which comprises a hollow handle on the body extending upward and forward from its rear and located substantially centrally of the body sides at the opposite side of said pivotal mounting to the saw, an angled support having a lower arm adapted to rest on the base plate and pivoted at its free end thereto in coaxial alignment with the lateral tilting pivot of said forward mount, said support also having an upright arm projecting up into the hollow of said handle and guided for lengthwise movements therein, means cooperating with the base plate to engage the lower arm and hold the support in predetermined lateral tilted relation to the base plate, and means operable to hold the handle and support in adjusted relation.

6. A combination as called for in claim 5, wherein said last means is carried by the handle and includes a support clamping member within the handle which guides the movements of the handle on the support.

7. In a portable power saw having a base plate, a body carrying a saw at one side thereof and pivoted at its forward end to said plate for forward tilting movements relative thereto to vary the saw cutting depth, and a hollow handle on the body extending upward and forward at its rear on an arc from a point adjacent to the base plate, the improvement which comprises an arcuate support rising from the rear portion of the base plate within and in substantial longitudinal register with said handle to cooperate therewith to guide the tilting movements of the body relative to the base plate, and means carried by the handle for firmly holding the handle and support in adjusted relation.

8. In a portable power saw having a base plate, a body carrying a saw at one side thereof and pivoted at its forward end to said plate for forward tilting movements relative thereto to vary the saw cutting depth, said body also having at its forward side adjacent to said first pivot and the saw a pivotal connection with the base plate permitting lateral tilting of the body relative to the base plate to obtain a saw cut bevel, and a hollow handle on the body extending upward and forward at its rear from adjacent to the base plate, the improvement which comprises a support rising from the rear portion of the base plate within and in substantial longitudinal register with said handle to cooperate therewith to guide the forward tilting movements of the body relative to the base plate, said support having a lateral offset part at its lower end, a pivotal connection between said offset part at its free end and the base plate with its pivotal axis aligned with the axis of said lateral pivotal connection between the body and base plate to permit lateral tilting of the body relative to the base plate to obtain a bevel cut, means for holding the support and handle in adjusted relation, and means for holding the support and body in lateral tilted adjusted relation to the base plate.

References Cited in the file of this patent

UNITED STATES PATENTS

| | | |
|---|---|---|
| 1,607,197 | Hatleli | Nov. 16, 1926 |
| 1,672,238 | Wallace et al. | June 5, 1928 |
| 1,830,579 | Wappat | Nov. 3, 1931 |
| 2,693,832 | Richards et al. | Nov. 9, 1954 |

FOREIGN PATENTS

| | | |
|---|---|---|
| 1,096,835 | France | Feb. 9, 1955 |